Dec. 12, 1967 L. W. HALPIN 3,358,218
SIGNAL CONTROLLED ON-OFF MAXIMUM POWER TRANSFER SYSTEM
Filed Feb. 11, 1964 2 Sheets-Sheet 1

INVENTOR
LAWRENCE WAYNE HALPIN
BY
Reynolds & Christensen
ATTORNEYS

Dec. 12, 1967 L. W. HALPIN 3,358,218

SIGNAL CONTROLLED ON-OFF MAXIMUM POWER TRANSFER SYSTEM

Filed Feb. 11, 1964 2 Sheets-Sheet 2

INVENTOR.
LAWRENCE WAYNE HALPIN

BY
Reynolds & Christensen
ATTORNEYS

United States Patent Office 3,358,218

Patented Dec. 12, 1967

3,358,218

SIGNAL CONTROLLED ON-OFF MAXIMUM POWER TRANSFER SYSTEM

Lawrence W. Halpin, Seattle, Wash., assignor to United Control Corporation, Redmond, Wash., a corporation of Washington Filed Feb. 11, 1964, Ser. No. 344,031
6 Claims. (Cl. 323—22)

This invention relates to improvements in signal controlled on-off power transfer or switching circuits responsive to a change of electrical condition through a critical value or values. The invention is herein illustratively described by reference to the presently preferred embodiment thereof; however it will be recognized that certain modifications and changes therein with respect to detail may be made without departing from the essential features involved.

An important object of this invention is to devise such a circuit capable of substantially instantaneous response and to transfer maximum power to a load device when signal voltage, current or other electrical condition changes through a predetermined value. A related object is to achieve this result in a system the load circuit of which is energized by alternating voltage, and in such manner that switching to the "on" condition is achieved with minimum transient effect due to abrupt large changes of current flow which could produce radio-frequency interference noise. In this connection it is a purpose hereof to devise such a circuit wherein output switching power is produced consistently as early as possible in the first half-cycle of applied power source voltage during which the electrical condition being detected exceeds the threshold value.

A further object hereof is to devise such a detection system having improved detent or latching means. More specifically it is an object to incorporate means to control the degree of hysteresis, that is the degree of "nervousness" or sensitivity of the circuit, in consistently reliable manner. In so doing, the invention overcomes the problems of instability inherent in prior devices relying upon auxiliary relays or auxiliary contacts in power relays as a means to produce holding or latching action. Such problems in prior devices are attributable to difficulty experienced in achieving precise and consistent synchronization of contact-making in the associated relays or relay contacts necessary to insure the result.

Further objects of this invention include devising detection circuits of the described type lending themselves to use of solid-state detection elements, including amplifiers, rectifiers and switches, and lending themselves to low-cost manufacture, simple and convenient calibration and related advantages ordinarily sought in electronic circuits which may be put to use under conditions of demanding stringent specifications.

As herein disclosed, the invention is applied to the detection of a change of electrical resistance so as to energize a load (such as power relay coil) when resistance value drops below a preselected threshold or control point for the circuit, and for de-energizing the load when such resistance rises above a preselected cutoff point. In accordance with one feature hereof separation between the threshold or control point value and the cutoff value is established, ignoring minor inherent circuit hysteresis, by deriving directly from load circuit voltage or its equivalent (usually from voltage developed across the load-energizing rectifier switch) a feedback voltage which is applied as bias to the input of the detection amplifier. Thus the application and removal of this bias, which delays triggering of the load-energizing switch during an increase of signal value with the load not yet being energized, depends inherently and necessarily upon the presence or absence of energizing voltage in the output circuit and not upon the making or breaking of a mechanical contact. A highly important feature of the invention resides in the means by which, through a 90-degree phase advance imparted to the switch-triggering signal relative to the load circuit energizing alternating voltage, triggering voltage impulse value will be at its cyclical maximum at the inception of the next available energization half-cycle of load circuit energizing voltage. Consequently, the output switching device will be rendered conductive to the maximum extent and for the maximum time while avoiding the abrupt large changes of load current which occur when switching is random or is timed to occur at a point in the energizing cycle when voltage is high.

These and other features, objects and advantages of the invention will become more fully evident from the following description thereof by reference to the accompanying drawings.

Figure 1:
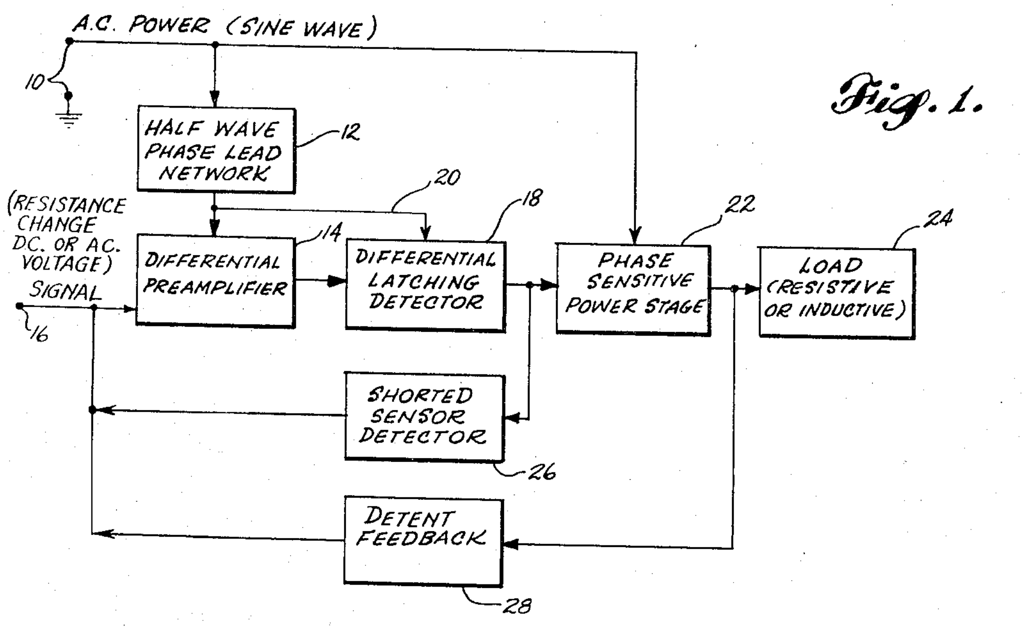
FIGURE 1 is a block diagram of a detection system representing the presently preferred embodiment.

Referring to FIGURE 1, alternating voltage applied at input terminals 10 is rectified and advanced 90 electrical degrees by network 12 before application to differential preamplifier 14. Depending upon the value of the applied signal at input terminal 16, differential amplifier 14 either delivers or fails to deliver a sufficient output signal to trigger the differential latching detector 18 into its "on" or conductive state. Once rendered conductive during application of power source voltage to it (through conductor 20), detector 18 remains conductive until termination of the half-wave cycle of power source 10, 12. If detector 18 is conductive during half-cycle periods of source voltage which will operate phase sensitive power stage 22, the latter applies energizing voltage to its load 24. An important feature of the present invention resides in the 90-degree phase lead of trigger voltage applied to detector 18 relative to voltage applied to the load circuit of power stage 22, such that when trigger voltage is produced by the detector it will be a maximum at the beginning of the energizing half-cycle of alternating voltage applied to the load circuit of power stage 22. Consequently, power stage 22 will commence to conduct at once and with a gradual increase determined by the applied energizing voltage waveform. This avoids any abrupt transients productive of radio-frequency interference noise, and maximizes power applied to the load.

A shorted sensor detector 26 effectively connected between the input of power stage 22 and the input of differential amplifier 14 prevents operation of the power stage 22 in the event the signal input circuit is shorted out. Feedback circuit 28 is connected between the output of power stage 22 and the input of differenital preamplifier 14. When the detector is in the "off" condition (i.e., no power being applied to the load) a feedback voltage then developed is applied as bias to the input of the differential preamplifier and is of a sense which, in order to return the detector to the "on" condition, requires change of input signal to a value beyond that which produced the cutoff condition in the first instance. "Nervousness" or oversensitivity of the system to signal fluctuations of minor amplitude is thereby reduced. By thus changing the effective hysteresis factor in the response characteristic of the system by the method of deriving a feedback signal directly from load circuit voltage, or its equivalent, the improved system avoids any problem of desynchronization of the detent function (i.e., feedback voltage) with the load function, such as that which typically can occur when the detent or lag effect is derived from use of an auxiliary relay or an auxiliary contact on a load relay.

Figure 2:
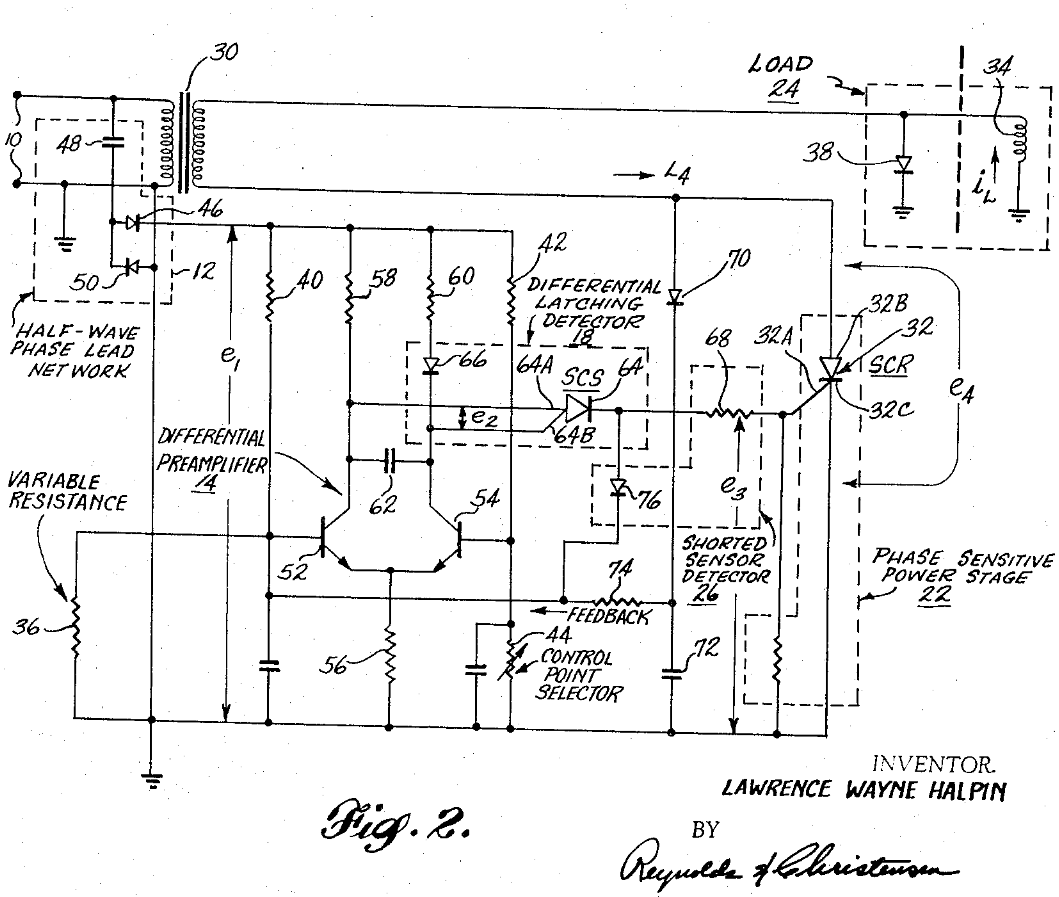
FIGURE 2 is a schematic circuit diagram in which the disclosed embodiment is applied to energization and de-energization of a load in accordance with changes of value of an electrical resistance, such as a temperature sensitive resistance.

Referring specifically to FIGURE 2, which illustrates a circuit application of the preferred embodiment, certain reference numerals corresponding to those used in FIGURE 1 apply to similar parts or combinations of parts. In this example the secondary of input transformer 30 is conconnected serially with load 24 and phase-sensitive power stage 22. Power stage 22 comprises a silicon controlled rectifier (SCR) 32 or equivalent having a controlled input electrode element 32A and load electrode elements, 32B and 32C. Load 24 comprises the inductive winding 34 of a power relay or other electrically energizable device and is shunted by a diode rectifier 38 providing a path for holding current in the relay coil during the half cycle of the applied voltage in which the silicon controlled rectifier 32 is nonconductive. The chief function of the remaining portion of the circuit shown in FIGURE 2 is to control rectifier 32 so as to energize the load 24 with maximum available power whenever the value of the variable resistance 36 (such as a temperature sensitive resistance placed in a medium being monitored for temperature, whether for purposes of indication or for purposes of control) decreases below a predetermined threshold value and for de-energizing the load whenever such resistance value rises above a predetermined upper value.

Resistance 36 is connected, in a resistance bridge, in series with resistance 40. The opposite side of the bridge comprises series resistances 42 and 44. Resistance 44 is adjustable in order to establish the control point of the detector, that is the threshold value at which the detector responds to decreasing value of resistance 36. Half-wave alternating voltage from input terminals 10 is impressed across this bridge through network 12. This network includes a rectifier 46 in series with a phase-shifting condenser 48 connected to one side of the input 10 (in this case the positive side), with the junction between the rectifier and the condenser connected to the grounded opposite side of input 10 through rectifier 50. This rectifier is arranged with a polarity opposite that of rectifier 46 so as to provide a return path for discharging the condenser 48 on the alternate half-cycles.

Opposite sides of the resistance bridge are connected to the base terminals of the respective transistors 52 and 54 arranged in a differential preamplifier circuit. The latter circuit includes a common emitter resistance 56 and respective load resistors 58 and 60 connected between the collectors of the transistors and the power supply. A filter condenser 62 is connected between the transistor collectors. These collectors in turn are connected to the respective input control terminals 64A and 64B of a silicon controlled switch (SCS) 64 with such relative polarity that the silicon controlled switch is rendered conductive when the difference in collector voltages exceeds a certain value with a given polarity. The silicon controlled switch 64 is a device similar to the well known silicon controlled rectifier which operates in a manner somewhat similar to the familiar thyratron. Such a device remains nonconductive during application of voltage across its principal electrodes until a trigger voltage is applied through the control electrodes sufficient to render the device conductive, then it remains conductive without regard to changes in control voltage. Conduction terminates only when principal electrode voltage is removed.

At balance in the bridge circuit, the sensor resistance 36 is equal in value to the reference resistance 44 and equal currents flow through transistors 52 and 54 and their associated collector resistances 58 and 60. Increasing values of sensor resistance 36 increase current flow through transistor 52, thereby decreasing current flow through transistor 54 because of the bias effect of voltage drop occurring in resistance 56. These changes in collector currents cause the collector of transistor 52 to become less positive and that of transistor 54 to become more positive. Obviously, decreasing values of sensor resistance 36 cause the opposite effect. In the illustrative case, switch 64 becomes conductive when resistance 36 drops to a predetermined value representing the detector circuit control point or threshold.

In the illustrated circuit diode 66 is incorporated in series with the collector resistance 60 to compensate for shift in firing voltage of the silicon controlled switch 64 as a function of ambient temperature, thereby to assure a substantially fixed bias (filtered by condenser 62) in the collector load of transistor 54. The amount of bias thus established is selected so that triggering of the silicon controlled switch 64 in response to a decrease in resistance 36 is made to occur with only a small departure of the resistance bridge from the null or balance condition. Once the silicon controlled switch 64 is rendered conductive by sufficient output from preamplifier 14, output half-waves applied through resistance 68 to the control element or gate 32A of silicon controlled rectifier 32 trigger the rectifier 32. These trigger pulses are so phased as to pass through their cyclical maximums when anode voltage being applied to the rectifier 32 is commencing its positive half cycle.

In the illustrated differential preamplifier and bridge circuit combination the amplifier variable-amplitude input signal is a recurring half wave of alternating voltage. However, it will be recognized that the signal may be a direct voltage or a full wave of alternating voltage if desired. Alternatively, it may be a periodic impulse of voltage of a non-sinusoidal form. In any case the output difference or error voltage produced by the differential preamplifier 14 must be of pulsating or alternating form (preferably a half wave of alternating voltage derived ultimately from the same source as that energizing the load circuit or a source synchronous therewith), phase-shifted ahead of the power source voltage applied to the power stage 22 for reasons elsewhere explained herein. Further, it will be seen that a pulsating or alternating voltage from the differential preamplifier 14, bearing the desired phase relationship with power source voltage for power stage 22, may be obtained with a direct-voltage supply for the preamplifier 14 provided the signal voltage being detected by the preamplifier 14 is itself alternating.

Figure 3:
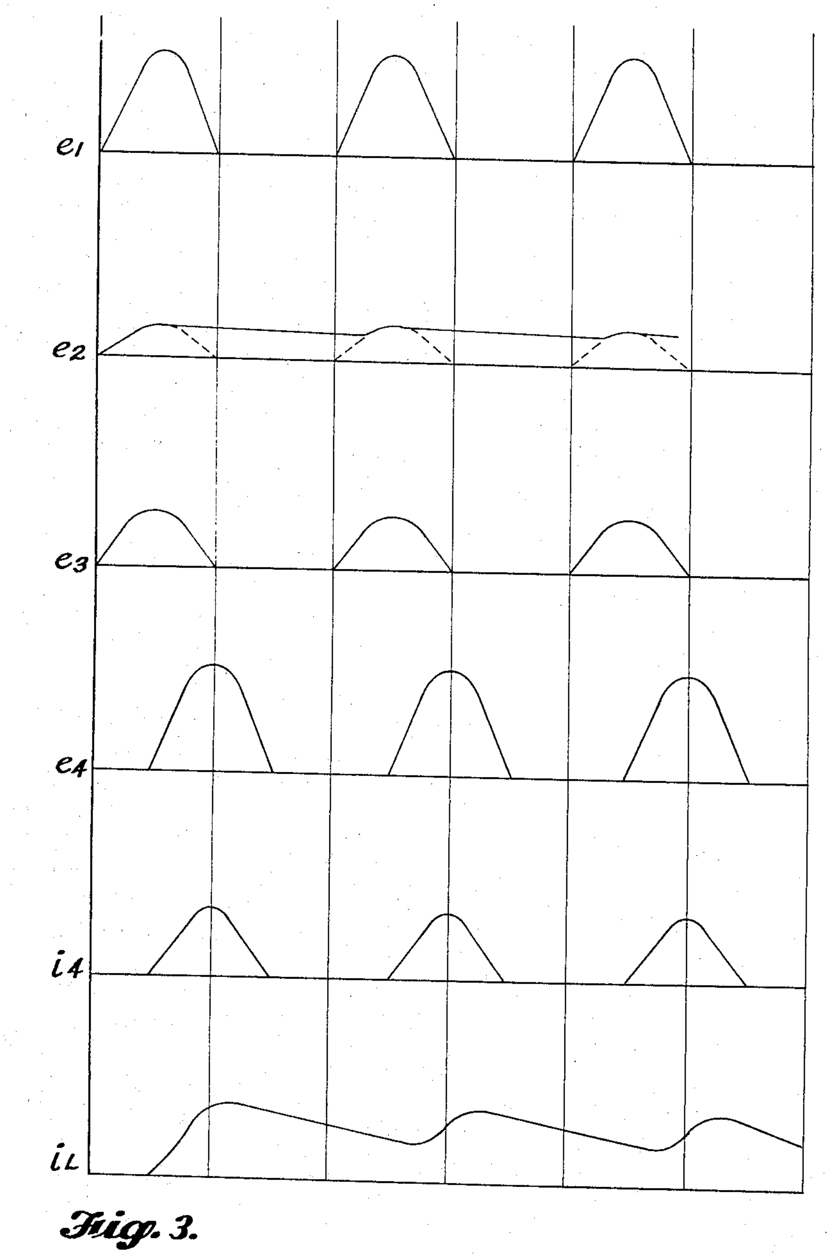
FIGURE 3 is a graph with wave diagrams approximately depicting voltages and currents occurring in certain portions of the circuit in FIGURE 2.

FIGURE 3 illustrates the various voltages and currents designated in different portions of the circuit in FIGURE 2. It will be appreciated that ideally the output impulse delivered by the silicon controlled switch 64 leads the half-wave impulses applied to the silicon controlled rectifier 32 by 90 electrical degrees and that this phase lead is readily achieved by a phase shift circuit, including the condenser 48 in the half-wave power supply network 12. However, it is obvious that other means may be used to achieve the same phase relationship, including a network which shifts phase of the voltage applied by the secondary of transformer 30 to the load circuit, either as the sole means of establishing the desired phase relationship between the triggering and load-energizing voltages, or in conjunction with a means producing some phase shift in the voltage impressed upon the detector portion of the circuit. As previously pointed out an important objective is to permit the silicon controlled rectifier 32 to conduct throughout substantially its full half-wave energizing cycle, and to avoid rendering it initially conductive at some delayed point in the intermediate portion of that cycle. Therefore, it will also be recognized that, for purposes of this feature of the invention, a phase lead of precisely 90 degrees is not necessary nor critical but that it is desirable that the impressed trigger voltage at least approach its maximum cyclical value when the rectifier 32 is capable of conducting under applied load circuit voltage.

As a further important feature of the system, precisely synchronized and reliable detent action is achieved by connecting the rectifier 70 and filter condenser 72 across the silicon controlled rectifier 32 as a means of producing a bias voltage which utilizes voltage applied across the rectifier 32 when the latter is in its nonconductive state. Resistance 74 is connected between the junction of rectifier 70 and condenser 72 and the junction of sensor resistance 36 and bridge resistance 40, i.e., the input of differential amplifier 14. The feedback bias voltage thus developed is applied to the base of transistor 52 in such manner as to raise the sensitivity threshold of the detector to a signal value above the cutoff point. In effect this bias makes the resistance of sensor resistance 36 appear to be greater in the "off" condition of the system for a given value of temperature being sensed by resistance 36, than it is in the "on" condition, for the same value of temperature. Such a feedback arrangement reduces "nervousness" or sensitivity of the system so that it will not fluctuate rapidly between the "on" and "off" conditions when resistance value of sensor 36 hovers near a critical point.

It will be appreciated that the method just described for deriving this detent bias is unique in that it avoids use of an auxiliary relay or auxiliary contact of power (load) relay, with attendant problems of achieving precise synchronization of the contact-making function of the respective sets of contacts. In this case the presence or absence of voltage developed depends unchangably upon whether the system is operating in the "off" or "on" condition, is utilized to derive the detent signal, so that synchronization is inherent.

Adverse effects from the possible condition of a short-circuited sensor resistance 36 are avoided by incorporating a sensing device of the fail-safe type which assures that load power will be off under such conditions. Such a sensing device comprises the rectifier 76 connected from the cathode of the silicon controlled switch 64 to the base of transistor 52. A short-circuit condition developing across the input, that is across resistance 36, causes such a drop in potential at the cathode side of the rectifier 76 as to by-pass current delivered by silicon controlled switch 64 from the input to the silicon controlled rectifier 32 and thereby prevents the latter from becoming conductive. The value of resistance 68 determines the fail-safe point, that is the value of decreasing sensor resistance 36 below which the system will respond as if to a short-circuit condition. In the absence of a short-circuit condition the value of resistance 36 remains sufficiently high that the by-pass effect produced by rectifier 76 is negligible (or nonexistent if rectifier 76 is precluded from conduction by reverse polarity of its terminal voltage) that is it does not impair sensitivity of the rectifier 32 to output triggering pulses from switch 64. Temperature compensation of the fail-safe point is readily attained by use of a positive temperature coefficient resistance material for the resistor 68.

It will be seen from the foregoing description that the illustrated temperature-sensitive control device utilizing a resistance type sensing element 36 is in fact a polarity sensitive voltage detector. It achieves a high degree of sensitivity, with stability, while employing a minimum number of relatively low-cost components connected in simple circuit configurations. Its uses are manifold in the detection and/or control of any of different functions or circuit operations, whether electronic or electromechanical, or it may be used to deliver a voltage or current, whether direct or alternating for any purpose. These and other features and aspects of the invetnion will be evident to those skilled in the art based on the present disclosure of the preferred practices thereof.

I claim as my invention:

1. Signal-actuated control means, comprising a load, a switching device having an electrically triggerable control input, an alternating voltage source, circuit means interconnecting said device, load and voltage source to energize the load by conduction of the switching device, an alternating voltage circuit including detector means having a signal input and an output connected to said control input for applying trigger impulses thereto cyclically in response to an input signal of predetermined value, means connected for deriving voltage from across the switching device with the latter non-conductive and for applying such voltage as bias to the detector means in a sense delaying conduction of the detection means during change of input signal toward said predetermined value and thereby introducing hysteresis in the control means, and means in said alternating voltage circuit phasing the maximums of said trigger impulses substantially at the initiations of said voltage source cycles, whereby to maximize energy applied to the load by said switching device.

2. A system for energizing and de-energizing a load in response to change of signal above and below a control level, comprising load circuit means including a power source of alternating voltage and a controlled rectifier having an output connected serially with said power source, and a control input, and which rectifier characteristically during any half cycle of source voltage of predetermined polarity across its output, becomes and remains conductive in response to triggering of its control input by triggering voltage of given polarity, a signal source, signal detection circuit means connected to said signal source and having a signal input, an output connected to said control input, and energizing means including a source of alternating voltage synchronous with the power source whereby half cycle waves of triggering voltage are applied to said control input to render the rectifier conductive in response to signal level from said source changing in one direction beyond a predetermined threshold value, a rectifying circuit having an input connected to be impressed with the alternating voltage occurring across the controlled rectifier of said predetermined polarity for deriving bias voltage in the non-conductive state of said rectifier, and means applying said bias voltage to the signal detection circuit means for establishing said threshold value at a signal level which differs from that at which the rectifier becomes non-conductive on change of signal level in the opposite direction so as to introduce hysteresis in the system, and means operatively associated with said sources causing the phasing of said triggering voltage half cycle waves to lead said power source half cycle waves.

3. Load energizing circuit means for energizing a load from a source of alternating voltage, comprising a unidirectionally conductive controlled switching device of the type remaining conductive during application of voltage of predetermined polarity thereto once rendered conductive by trigger voltage applied thereto above a threshold value, said device being interposed between the source and the load, and means for applying control voltage to the switching device comprising a second source of alternating voltage displaced in advance of the voltage of said first source by substantially 90 electrical degrees, and control means connected for applying voltage from said second source to said switching device with variable amplitude, including input means operable to vary said applied voltage amplitude between values above and below said threshold value, said input means comprising a detector responsive to an input electrical signal to trigger said switching device into conduction when changing input signal reaches a predetermined critical value, and means to bias the input means, including a rectifier deriving voltage from the circuit means in the non-conductive state of the switching device to separate said critical value for triggering from the signal value at which triggering ceases on a reverse change of input signal.

4. The combination defined in claim 3, wherein the input means comprises an amplifier having an input and an output, a bridge circuit connected to said input and including a variable signal element in one arm thereof and a variable element in a different arm thereof adjustable to vary said critical value.

5. The combination defined in claim 4, wherein the control means further includes a switching means having an input connected to the amplifier output and having an output circuit connected to apply trigger voltage to the switching device from the second alternating voltage source in response to output from said amplifier.

6. The combination defined in claim 5, and fail-safe means including an impedance interposed between the switching device and switching means, and conductive means connected between said amplifier input and the junction of said impedance and switching means to by-pass the triggering signals from the latter in response to a short in the amplifier input.

References Cited

UNITED STATES PATENTS 3,204,113 8/1965 Snygg ------------- 307—88.5

JOHN F. COUCH, *Primary Examiner.*

K. D. MOORE, *Assistant Examiner.*